US008605115B2

(12) United States Patent
Dettinger et al.

(10) Patent No.: US 8,605,115 B2
(45) Date of Patent: Dec. 10, 2013

(54) RECOMMENDATIONS FOR OBJECT USE IN VIRTUAL ENVIRONMENT

(75) Inventors: Richard D. Dettinger, Rochester, MN (US); Frederick A. Kulack, Rochester, MN (US); Kevin G. Paterson, San Antonio, TX (US); Shannon E. Wenzel, Colby, WI (US)

(73) Assignee: International Business Machines Corporation, Armonk, NY (US)

(*) Notice: Subject to any disclaimer, the term of this patent is extended or adjusted under 35 U.S.C. 154(b) by 1138 days.

(21) Appl. No.: 12/195,797

(22) Filed: Aug. 21, 2008

(65) Prior Publication Data

US 2010/0045660 A1 Feb. 25, 2010

(51) Int. Cl.

| | |
|---|---|
| ***G09G 5/00*** | (2006.01) |
| ***G06T 15/00*** | (2011.01) |
| ***G06F 3/041*** | (2006.01) |
| ***G06F 17/00*** | (2006.01) |
| ***G06F 3/048*** | (2013.01) |
| ***G06Q 30/00*** | (2012.01) |
| ***G06Q 10/00*** | (2012.01) |

(52) U.S. Cl.

USPC ........... 345/633; 345/419; 345/426; 345/581; 345/173; 463/25; 463/31; 705/14.1; 705/26.1; 705/28; 715/706; 715/757

(58) Field of Classification Search

None

See application file for complete search history.

(56) References Cited

U.S. PATENT DOCUMENTS

| | | | | |
|---|---|---|---|---|
| 6,476,830 | B1 | 11/2002 | Farmer et al. | |
| 7,173,177 | B1 | 2/2007 | Gould et al. | |
| 7,257,552 | B1 | 8/2007 | Franco | |
| 7,409,647 | B2 | 8/2008 | Elber et al. | |
| 2002/0059120 | A1 | 5/2002 | Milton | |
| 2003/0115132 | A1 | 6/2003 | Iggland | |
| 2004/0266505 | A1* | 12/2004 | Keam et al. | 463/1 |
| 2005/0261980 | A1 | 11/2005 | Hadi | |
| 2006/0277145 | A1 | 12/2006 | Raccah et al. | |
| 2007/0112624 | A1 | 5/2007 | Jung et al. | |
| 2007/0118420 | A1* | 5/2007 | Jung et al. | 705/10 |
| 2007/0211047 | A1* | 9/2007 | Doan et al. | 345/419 |
| 2007/0259713 | A1 | 11/2007 | Fiden et al. | |
| 2008/0153596 | A1 | 6/2008 | Nguyen | |
| 2008/0204448 | A1 | 8/2008 | Dawson et al. | |
| 2010/0050100 | A1 | 2/2010 | Dettinger et al. | |

OTHER PUBLICATIONS

Dettinger, et al., U.S. Patent Application entitled, "Virtual World Object Presentation, Recommendations and Navigation."

* cited by examiner

*Primary Examiner* — Tize Ma

(74) *Attorney, Agent, or Firm* — Patterson & Sheridan LLP

(57) ABSTRACT

Techniques are disclosed for helping users determine the "best" places to use and acquire inventory objects within a virtual environment, as well as to notify users of useful inventory items when an avatar is at a particular location in the virtual environment. An object index may be used to store data describing attributes of virtual objects, and a user index may be used to store data describing interactions users engage in with virtual objects.

20 Claims, 10 Drawing Sheets

200

| | 705 | 710 | 715 | 720 | 725 |
|---|---|---|---|---|---|
| | HOT | OBJECT | INTERACTION | VW LOCATION | EXTERNAL OBJECT |
| 730 | 1 | FISHING POLE | TIME USED: 3 hrs | X, Y, Z | LAKE |
| 740 | 2 | FISHING LURE | TIME USED: 2 hrs | X, Y, Z | LAKE |
| 750 | 3 | CANOE | TIME USED: 1.5 hrs | X, Y, Z | LAKE |

700

FIG. 7

RECOMMENDATIONS FOR OBJECT USE IN VIRTUAL ENVIRONMENT

BACKGROUND OF THE INVENTION

1. Field of the Invention

Embodiments of the invention relate to presenting users with an immersive virtual environment. More specifically, embodiments of the invention allow users of the virtual environment to determine where to use and acquire inventory objects as well as notify users of useful inventory items when an avatar is at a particular location within the virtual environment.

2. Description of the Related Art

A virtual world is a simulated environment in which users may inhabit and interact with one another via avatars. Users may also interact with virtual objects and locations of the virtual world. An avatar generally provides a graphical representation of an individual within the virtual world environment. Avatars are usually presented to other users as two or three-dimensional graphical representations that resembles a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like.

Virtual worlds may be persistent. A persistent world provides an immersive environment (e.g., a fantasy setting used as a setting for a role-playing game, or a virtual world complete with land, buildings, towns, and economies) that is generally always available, and world events happen continually, regardless of the presence of a given avatar. Thus, unlike more conventional online games or multi-user environments, the virtual world continues to exist, and plot and events continue to occur as users enter (and exit) the virtual world.

Within the virtual environment, avatars may have the ability to carry objects used to interact with elements of the virtual world. Depending on the particular environment (or location within an environment) different objects in an avatar's inventory may have a variety of uses at various locations. Moreover, certain objects may be more useful than others, depending upon the location of the avatar in the virtual world. Furthermore, an avatar may need to obtain an object from one location in the virtual world before using it at another location. For example, some virtual environments have matured to the point where economies have developed and goods may be bought and sold using virtual money. In such a case, a user might purchase virtual items at one location (e.g., virtual fishing equipment or camping gear) for use at different locations of the virtual world (e.g., a virtual lake). As another example, a user might enroll in classes offered by a virtual school and need to acquire certain virtual objects to participate in a given course.

SUMMARY OF THE INVENTION

One embodiment of the invention includes a method for identifying objects which may be used by an avatar at a first location within a virtual environment. The method may generally include identifying a first set of virtual objects in an inventory of the avatar representing the first user in the virtual environment, identifying the first location of the avatar within the virtual environment, and determining, for each identified virtual object, an interaction metric. The interaction metric provides a measure of how frequently each respective virtual object has been used by users of the virtual environment at the first location. The method may also include displaying a list of virtual objects that includes at least a first virtual object having an interaction metric that exceeds a specified threshold.

Another embodiment of the invention includes a computer-readable storage medium containing a program which, when executed, performs an operation for identifying objects which may be used by an avatar at a first location within a virtual environment. The operation may generally include identifying a first set of virtual objects in an inventory of the avatar representing the first user in the virtual environment, identifying the first location of the avatar within the virtual environment, and determining, for each identified virtual object, an interaction metric. The interaction metric provides a measure of how frequently each respective virtual object has been used by users of the virtual environment at the first location. The operation may also include displaying a list of virtual objects that includes at least a first virtual object having an interaction metric that exceeds a specified threshold.

Still another embodiment of the invention includes a system having a processor and a memory containing a program, which when executed by the processor, is configured to perform an operation for identifying objects which may be used by an avatar at a first location within a virtual environment. The operation may generally include identifying a first set of virtual objects in an inventory of the avatar representing the first user in the virtual environment, identifying the first location of the avatar within the virtual environment, and determining, for each identified virtual object, an interaction metric. The interaction metric provides a measure of how frequently each respective virtual object has been used by users of the virtual environment at the first location. The operation may also include displaying a list of virtual objects that includes at least a first virtual object having an interaction metric that exceeds a specified threshold.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 7 is a table illustrating interaction records stored in a user index, according to one embodiment of the invention.

DETAILED DESCRIPTION OF THE PREFERRED EMBODIMENTS

Figure 1:
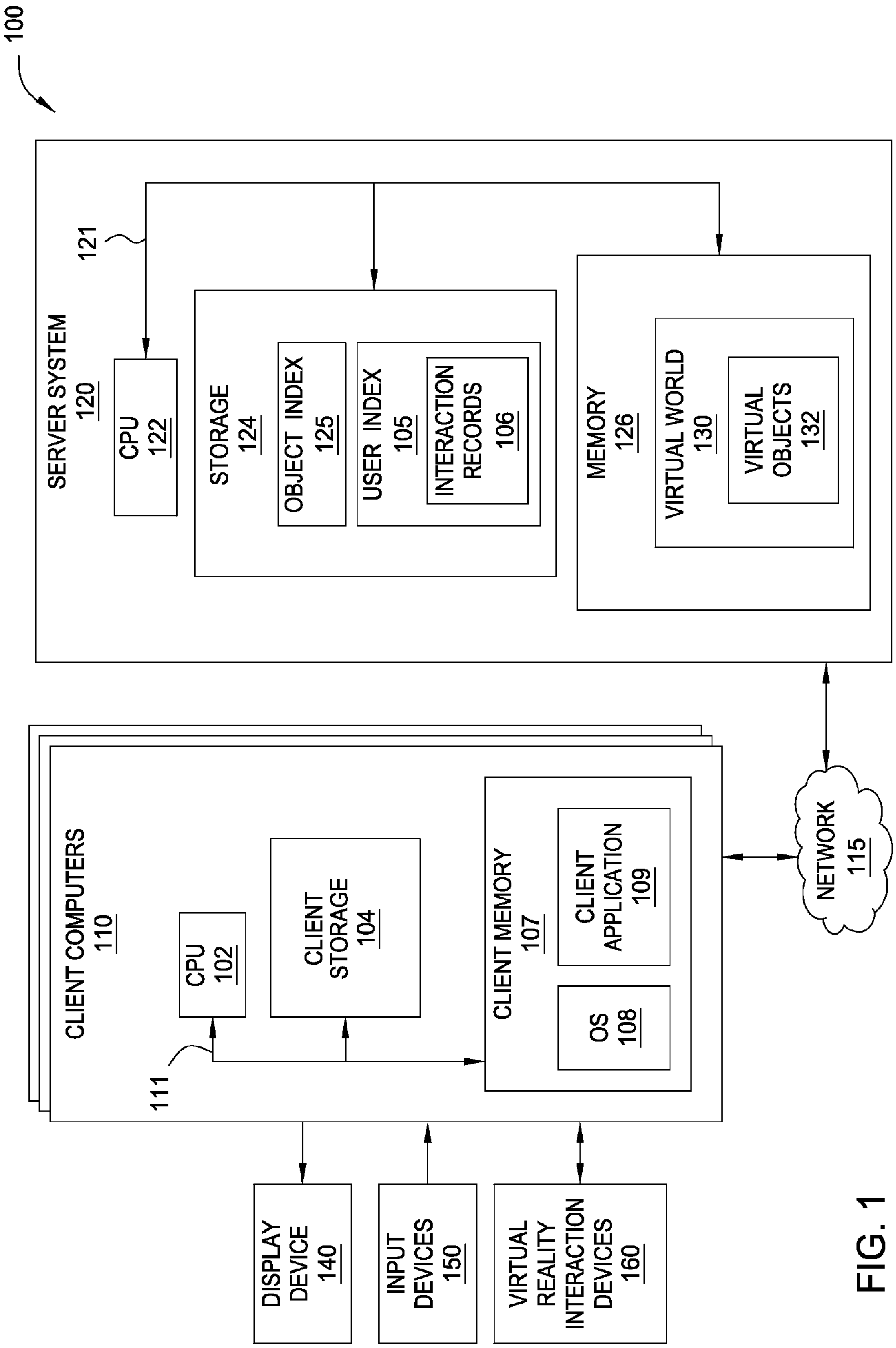
FIG. 1 is a block diagram that illustrates a client server view of a computing environment configured for displaying and obtaining virtual objects, according to one embodiment of the invention.

A virtual world is a simulated environment in which users may inhabit and interact with one another via avatars. Further, users may also interact with elements of the virtual world. Objects in an avatar's inventory, also referred to as inventory items, may have a variety of uses at various locations of the virtual world. However, the user may not know where a given object can be used or acquired (or in some cases even the existence of a given object). Moreover, when a user's avatar arrives at a particular location, the usefulness of an inventory object or potential inventory object may not be readily apparent.

For example, users may encounter (or acquire) objects within the virtual world without realizing that there is a way to interact with the virtual object by using another object already in the Avatar's possession. For example, a user that sees a small lake next to a path may not realize that a fishing pole can be used at the lake. Further, the user may not even know that a fishing pole can be acquired at a nearby virtual store. Moreover, even if the user has a fishing pole on hand as an inventory item, the user may have forgotten about it. If the user's list of inventory items is large, then it is possible that items may go unnoticed or forgotten. This may occur frequently as an avatar may "carry" a large amount of inventory items. In such cases, it may be extremely time-consuming for a user to examine all inventory items for usefulness every time a new object or location is encountered.

Embodiments of the invention provide techniques for helping users determine the "best" places to use and acquire inventory objects within a virtual environment as well as notify users of useful inventory items when an avatar is at a particular location in the virtual environment. Generally, an object index may be used to store data describing attributes of virtual objects, and a user index may be used to store data describing the interactions of multiple users with a variety of virtual objects. When a user selects an object from the avatar's inventory, or an object which may be acquired and added to an avatar's inventory, one or more external objects are recommended for use with the object, based upon the interaction records stored in the user index. If the object is not in the avatar's inventory, the user may be guided to a location where it may be acquired. Otherwise, the user may be guided to a location of a given external object which may be used with the object in inventory. Additional objects may also be recommended for use with the external object. If an avatar is in the same location as an external object, the user may be informed of what objects may be most useful with the external object.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive and DVDs readable by a DVD player) on which information is permanently stored; and (ii) writable storage media (e.g., floppy disks within a diskette drive, a hard-disk drive or random-access memory) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes client computers 110, network 115 and server system 120. In one embodiment, the computer systems illustrated in FIG. 1 are included to be representative of existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

In one embodiment, server system 120 includes a CPU 122, which obtains instructions and data via a bus 121 from memory 126 and storage 124. The processor 122 could be any processor adapted to support the methods of the invention. The memory 126 is any memory sufficiently large to hold the necessary programs and data structures. Memory 126 could be one or a combination of memory devices, including Random Access Memory, nonvolatile or backup memory, (e.g., programmable or Flash memories, read-only memories, etc.). In addition, memory 126 and storage 124 may be considered to include memory physically located elsewhere in a server 120, for example, on another computer coupled to the server 120 via bus 121. Server 120 may be operably connected to the network 115, which generally represents any kind of data communications network. Accordingly, the network 115 may represent both local and wide area networks, including the Internet.

As shown, memory 126 includes virtual world 130. In one embodiment, virtual world 130 may be a software application that accepts connections from multiple clients, allowing users to explore and interact with an immersive virtual environment by controlling the actions of an avatar. Illustratively, virtual world 130 includes virtual objects 132. Virtual objects 132 represent the content present within the environment provided by virtual world 130, including both elements of the "world" itself as well as elements controlled by a given user. Illustratively, storage 124 includes an object index 125, a user index 105, and interaction records 106. In one embodiment, the object index 125 may store data describing characteristics of virtual objects 132 included in virtual world 130, and may be accessed to perform searches of virtual objects 132. The user index 105 may store records describing interactions between users and elements of the virtual world. Such characteristics may include, e.g., the name of the object's owner/creator, when the object was created, the object's cost, type, dimensions, color, shape, location, attributes, etc. The use of object index 125 in performing searches is discussed below with reference to client application 109.

As shown, each client computer 110 includes a central processing unit (CPU) 102, which obtains instructions and data via a bus 111 from client memory 107 and client storage 104. CPU 102 is a programmable logic device that performs all the instruction, logic, and mathematical processing in a computer. Client storage 104 stores application programs and data for use by client computer 110. Client storage 104 includes hard-disk drives, flash memory devices, optical media and the like. Client computer 110 is operably connected to the network 115.

Client memory 107 includes an operating system (OS) 108 and a client application 109. Operating system 108 is the software used for managing the operation of the client computer 110. Examples of OS 108 include UNIX, a version of the Microsoft Windows® operating system, and distributions of the Linux® operating system. (Note, Linux is a trademark of Linus Torvalds in the United States and other countries.)

In one embodiment, client application 109 provides a software program that allows a user to connect to a virtual world 130, and once connected, to explore and interact with virtual world 130. Further, client application 109 may be configured to generate and display a visual representation of the user within the immersive environment, generally referred to as an avatar. The avatar of the user is generally visible to other users in the virtual world, and the user may view avatars representing the other users. The client application 109 may also be configured to generate and display the immersive environment to the user and to transmit the user's desired actions to virtual world 130 on server 120. Such a display may include content from the virtual world determined from the user's line of sight at any given time. For the user, the display may include the avatar of that user or may be a camera eye where the user sees the virtual world through the eyes of the avatar representing this user.

Figure 2:
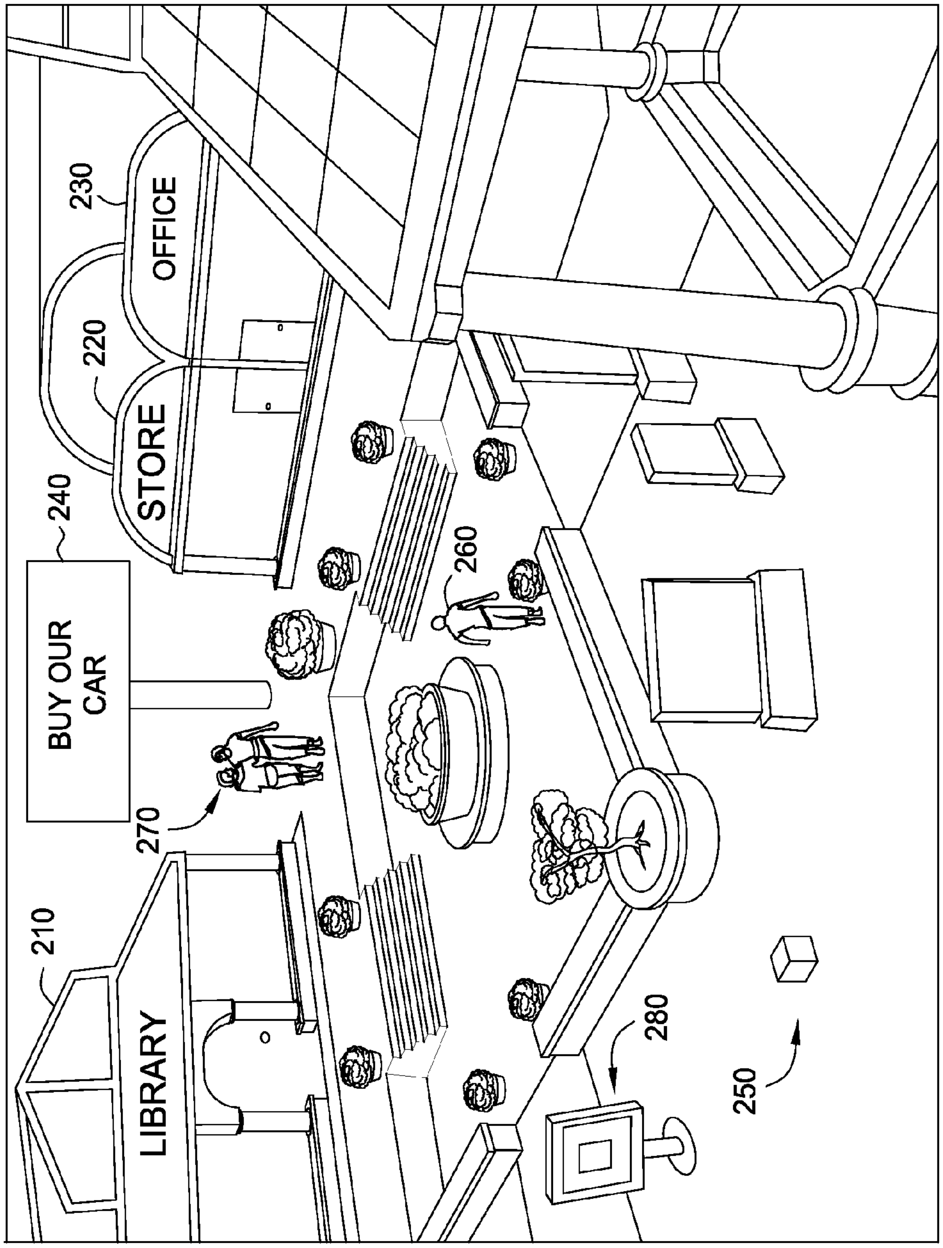
FIG. 2 illustrates an example display of a user participating in a virtual world, according to one embodiment of the invention.

For instance, using the example illustrated in FIG. 2, virtual objects 132 may include box 250, store 220, library 210, etc. More specifically, FIG. 2 illustrates a user display 200 for a user participating in a virtual world, according to one embodiment of the invention. In this example, the user is represented by avatar 260, and other users are represented by other avatars 270. The user may interact with elements displayed in user display 200. For example, the user may interact with a box 250 by picking it up, opening it, etc. The user may also interact with a kiosk 280 by operating controls built into the kiosk 280, requesting information, etc. The user may also interact with a billboard 240 by looking at it (i.e., by positioning the line of sight directly towards the billboard 240). Additionally, a user may interact with larger elements of the virtual world. For example, the user may be able to enter a store 220, an office 230, or a library 210. As used herein, the term "virtual objects" refers broadly to such elements of a virtual world (e.g., box 250, store 220, etc.).

The user may view the virtual world using a display device 140, such as an LCD or CRT monitor display, and interact with the client application 109 using input devices 150 (e.g., a keyboard and a mouse). Further, in one embodiment, the user may interact with client application 109 and virtual world 130 using a variety of virtual reality interaction devices 160. For example, the user may don a set of virtual reality goggles that have a screen display for each lens. Further, the goggles could be equipped with motion sensors that cause the view of the virtual world presented to the user to move based on the head movements of the individual. As another example, the user could don a pair of gloves configured to translate motion and movement of the user's hands into avatar movements within the virtual reality environment. Of course, embodiments of the invention are not limited to these examples and one of ordinary skill in the art will readily recognize that the invention may be adapted for use with a variety of devices configured to present the virtual world to the user and to translate movement/motion or other actions of the user into actions performed by the avatar representing that user within virtual world 130.

Within virtual world 130, avatars can interact with other avatars. For example, a user with avatar A could click on an avatar B to start an instant message conversation with the user associated with avatar B. Additionally, a user may interact with virtual objects 132. As used herein, the term "user interaction" is broadly defined to include any interactions with virtual objects 132 or with other avatars. For example, the user may click on a building within the virtual world labeled as a store (e.g., store 220 shown in FIG. 2). In response, the client application 109 could cause the avatar representing the user to walk to the store, enter a lobby area and present the user with the interior of the store, including a virtual salesmen avatar, virtual products, and other avatars present in the store within virtual world 130. The user may then further interact with virtual objects 132 inside the store, for instance looking at a virtual product, picking it up, and purchasing it. The product may represent items used within the virtual environment, e.g., clothing worn by the avatar, or virtual real estate within the virtual world 130, but may also represent real-world goods or services purchased from within the virtual world 130.

In one embodiment, client application 109 may be configured to enable users to determine where a given inventory item (or potential inventory item) can be used (or acquired). For example, an avatar may hold a particular credit card as an inventory item. Based upon data from interaction records 106, the credit card and the store 220 may have a strong "interaction metric," which would signify that users have often used the credit card with the store in the past. The interaction metric may be a calculated numeric value or some other value that indicates how useful a particular item is for an external object. For example, non-numeric values might include "none," "low," "medium," or "high." If the interaction metric is high enough, the credit card may be considered a "hot item," and the application 109 may suggest that the avatar could travel to the store 220 to use the credit card. Furthermore, the application 109 may provide a list of all potential inventory items. If an avatar does not have a particular credit card, the application 109 may obtain the location of the credit card from the object index 125 and guide the avatar to that location so the avatar can obtain it.

In another embodiment, client application 109 may be configured to notify users of useful inventory items (or potential inventory items) when an avatar is near a particular location within the virtual environment. For example, an avatar may hold a credit card as one of its inventory items while it walks near a store 220. If the interaction metric between the store 220 and the credit card is high, then the application 109 may display the credit card as a hot item when the user views the inventory. Alternatively, assume the avatar is displayed holding the card in its hand. In such a case, when the avatar passes by the store, the card could become highlighted or otherwise emphasized in the display of the virtual world presented to the user. If the avatar does not have the credit card, then the inventory list may display the credit card as a "hot" item and guide the avatar to another location so the avatar can obtain it. As another example, assume the user's avatar has a virtual key in its possession. In such a case, the user might not know where the key may be used. Assume further that the virtual key allows the user to enter a number of related stores in the virtual world. In such a case, the user could request a display of where the key could be used, and the client application 109 could respond with the list of stores their absolute location in the virtual world as well as their locations relative to the avatars' current position. Further, the key could begin to glow (or otherwise be emphasized in the display of the virtual world whenever the user approached a store where the key authorized entry.

Of course, the embodiments described above are intended to be illustrative, and are not limiting of the invention. Other embodiments are broadly contemplated. For example, the search functionality of client application 109 may be incorporated into a server-side application, such as an application hosting the virtual world 130, or in a separate application (e.g., a web browser). In yet another example, object index 125 and the user index 105 may be combined in a single data structure. In another example, object index 125 and user index 105 may store data describing the actions of other users (i.e., avatars) of virtual world 130.

Figure 3:
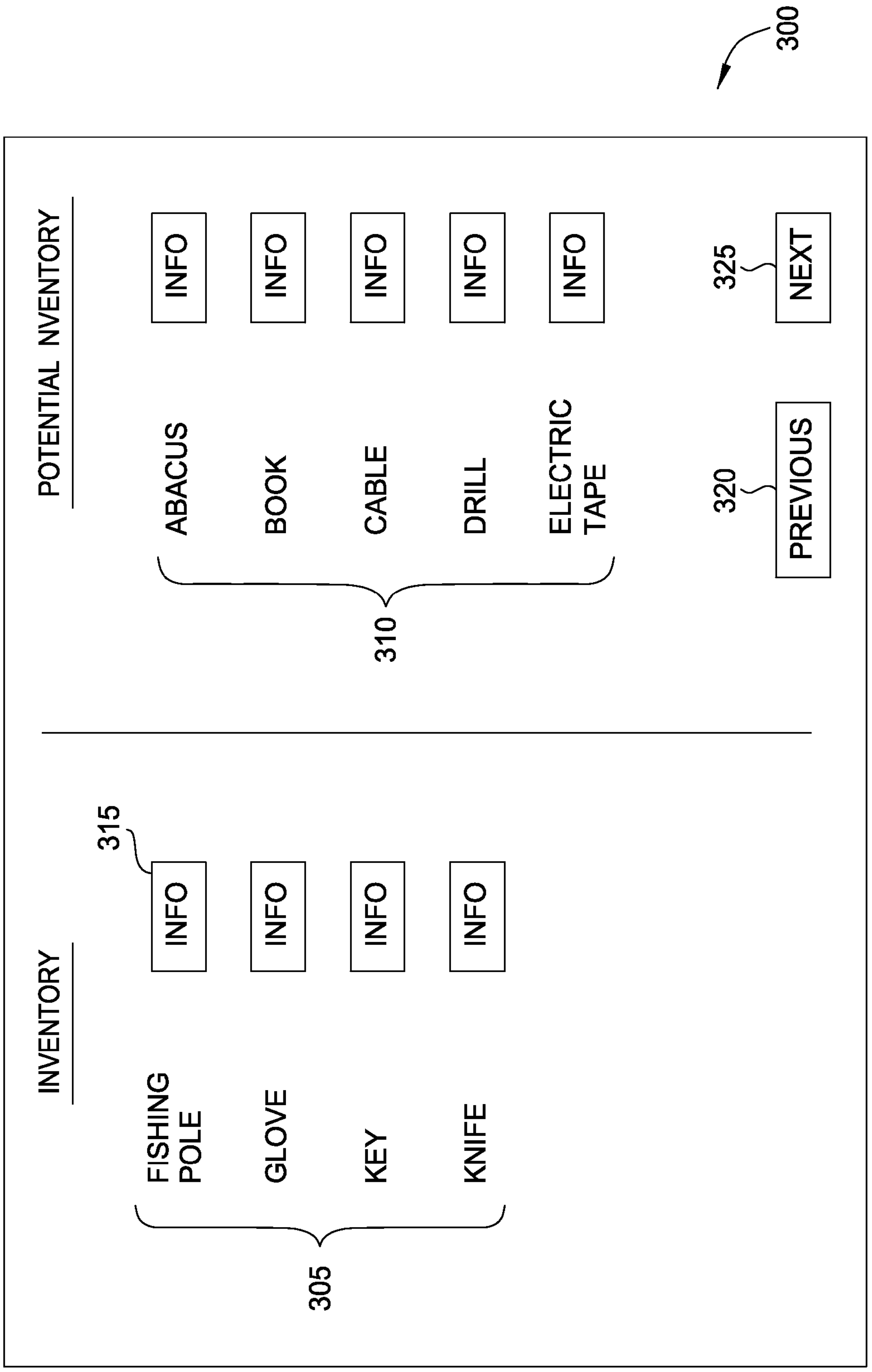
FIG. 3 illustrates an example display for obtaining information about inventory items, according to one embodiment of the invention.

FIG. 3 illustrates an example of a display 300 for presenting information to a user about items in the inventory of their avatar, according to one embodiment of the invention. When a user's avatar is located in the town square of FIG. 2, the user may wish to display a list 305 of items currently in the avatar's possession (i.e., inventory items) and a list 310 of items which may be acquired by the avatar (i.e., potential inventory). List 305 and 310 may be retrieved from the user index 105 and object index 125. If a list is too long to fit onto the display, then a previous button 320 and next button 325 may allow a user to browse more items (alternatively, the list may include a scroll bar). Illustratively, an information button 315 is located next to each inventory item or potential inventory item. The user may click on the information button 315 to receive suggestions about where a given item may be used (or acquired).

Figure 4:
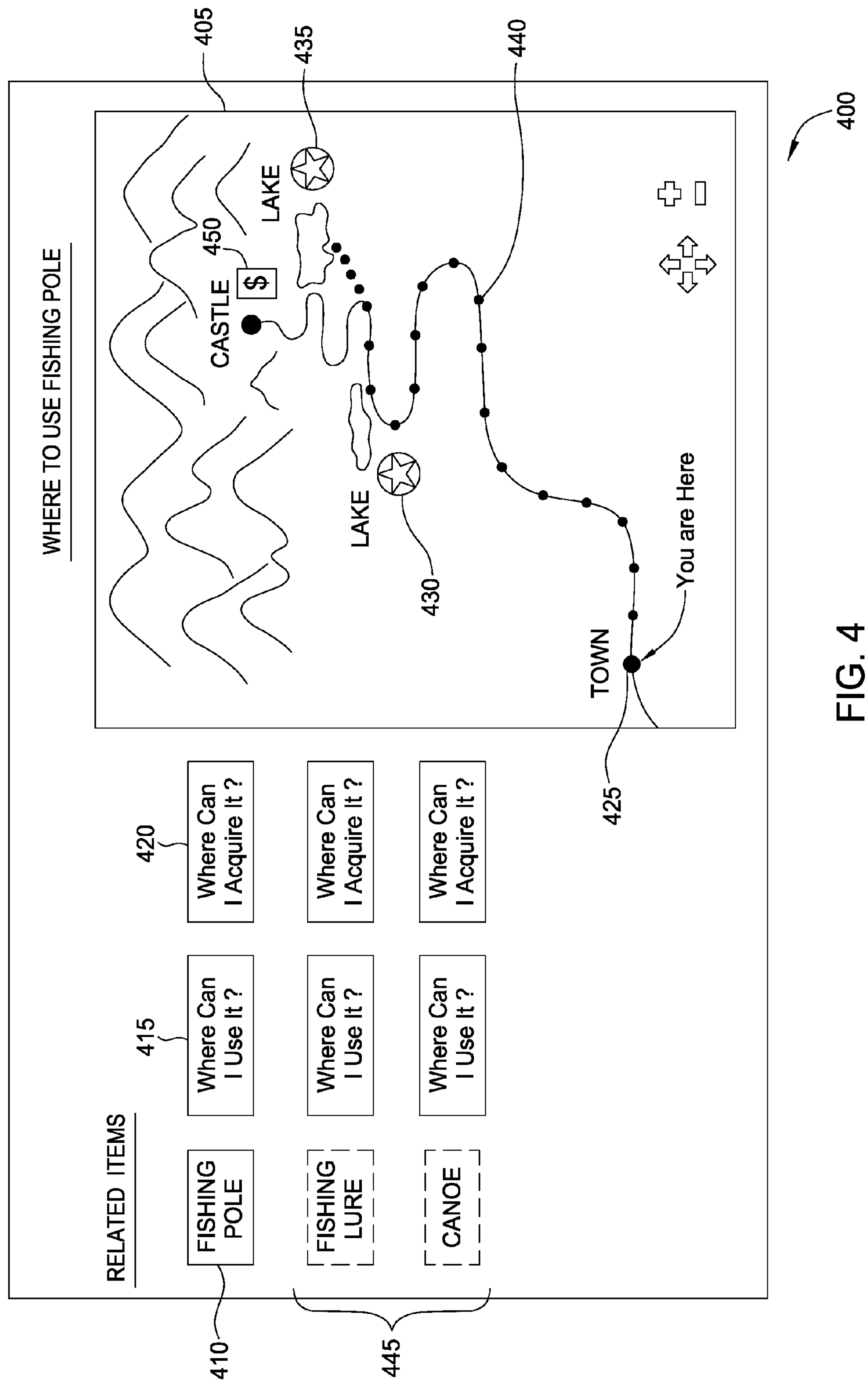
FIG. 4 illustrates an example display for obtaining information about an inventory item, including a map of where it can be used and a list of related items, according to one embodiment of the invention.

FIG. 4 illustrates an example user display 400 for obtaining information about various items an avatar's possession, according to one embodiment of the invention. Display 400 may be generated in response to the user selecting the information button 315 for one of the items in the avatar's inventory. In this example, display 400 presents information related to a virtual fishing pole in the avatar's possession. As shown, a selected item 410 indicates what inventory item was selected by the user. When the user clicks on the information button 315 for the fishing pole in the display 300 of FIG. 3, then the client application 109 may generate a map 405 to indicate where the avatar may use the fishing pole, based upon the strength of an interaction metric. In one embodiment, the interaction metric may be calculated using data from the interaction records 106. For example, the more other users interact with the selected object and a given external object (e.g., the fishing pole and the lake), the stronger the interaction metric. If the interaction metric between the selected object in the avatar's inventory and an external object of the virtual world exceeds a specified threshold, then the location of the external object may be displayed on the map. In one embodiment, the size and scale of the map may be scaled according to user preference. In this particular example, the map shows a close lake 430 and a distant lake 435 where the fishing pole may be used. If the user clicks on an information button 315 for an item that is not in the avatar's inventory 310, then the client application 109 may generate a map 405 to indicate where the avatar may acquire the item using an icon 450 (in this example a "$"). Further, the map 435 also shows the current location of the avatar 425 and a recommended route 440 to arrive at either of the lakes 430, 435.

As shown, the display 400 also lists the selected item 410 along with a related items list 445. In one embodiment, the application 109 may generate the related items list 445 using the interaction records 106. For example, if the interaction metric between a canoe 445 and the lake 430 exceeds a predefined threshold, then the canoe 445 may be listed in the related items list 445. Moreover, if a user often uses a canoe with a fishing pole, then the canoe 445 is more likely to be listed as a related item simply because it is used in conjunction with the fishing pole (or close in time). The threshold itself may be set as a matter of user preference. Furthermore, buttons 415 may allow a user to learn where items in the list 445 may be used and where such items may be acquired (e.g., using the icon 450 to indicate a virtual location where an item may be purchased). If the user selects multiple items, then the map 405 may also show the most efficient route to acquire and use all of the items. For example, if the user wants to acquire both a fishing lure and a canoe, whether the lake 430 or the lake 435 is suggested may depend upon where these objects can be acquired. For example, as shown, the map 405 indicates that a fishing lure may be acquired at one location using icon 450 and used at lake 435, as this lake is closer to the location where the fishing lure may be acquired.

Figure 5:
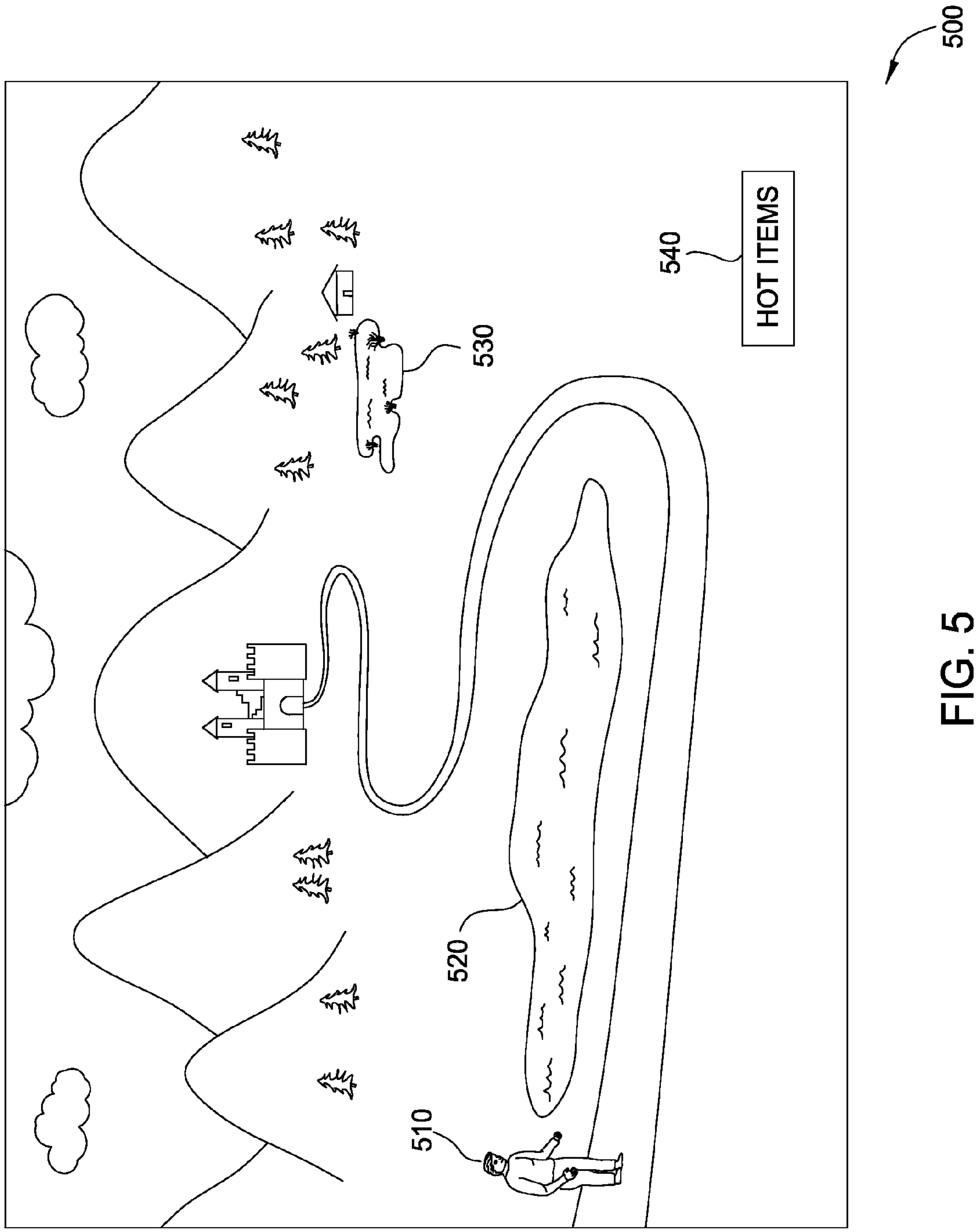
FIG. 5 illustrates an example display of a user participating in a virtual world, according to one embodiment of the invention.

FIG. 5 illustrates an example user display 500 of a user interacting with a virtual world, according to one embodiment of the invention. As shown, an avatar 510 is walking next to a lake 520. A second lake 530 is nearby. When the avatar approaches the lake 520, the client application 109 may alert the user as to inventory items (or potential inventory) items that have a high interaction metric with the lake 520. For example, a "hot items" graphic 540 may appear on the display 500. Of course, one of ordinary skill in the art will recognize that there are many ways to alert a user, such as by changing a mouse cursor, graphically enhancing an avatar, or causing a distinct sound to be played.

Figure 6:
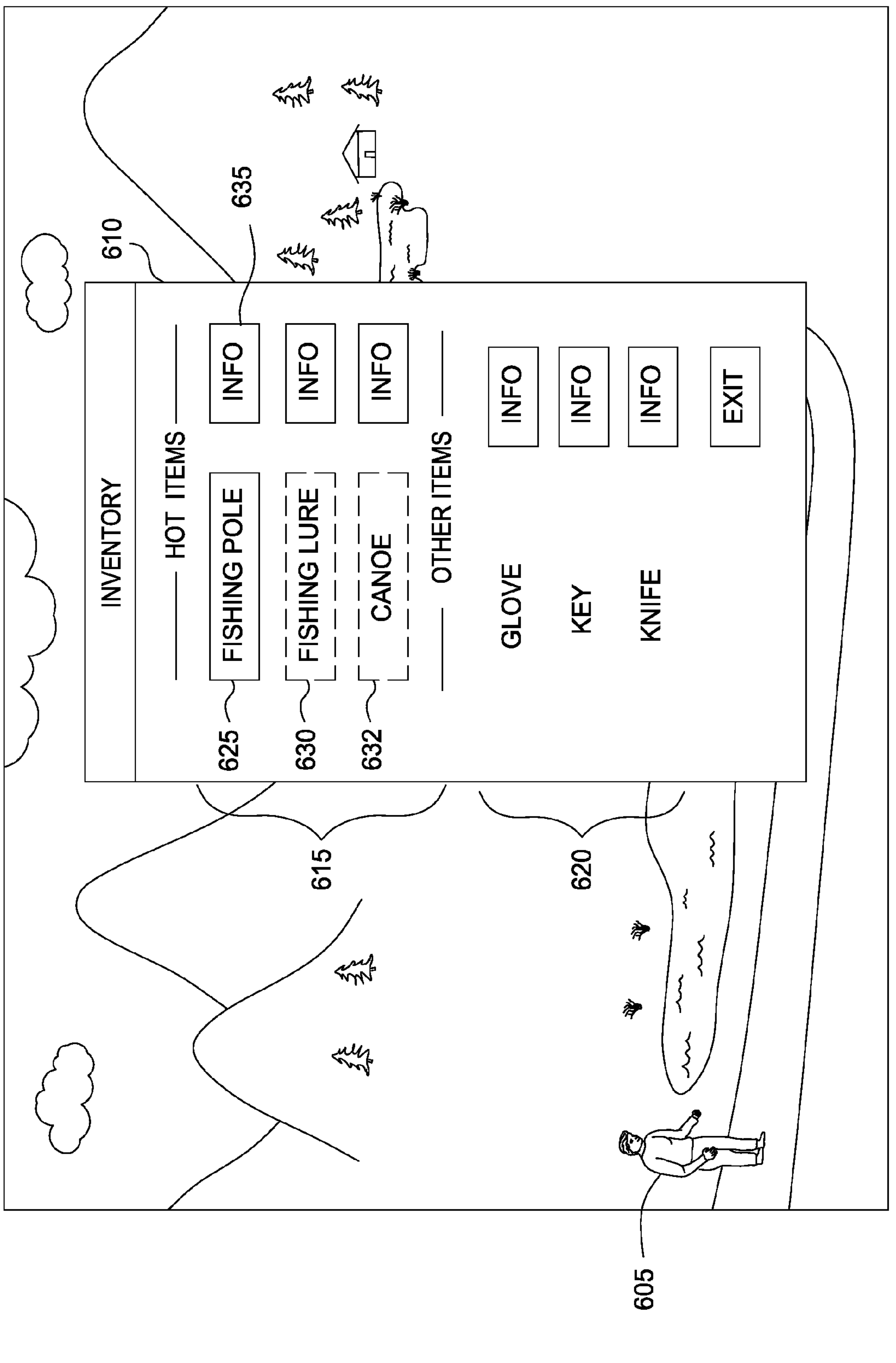
FIG. 6 illustrates an example display list of "hot" items for a user interacting with a virtual world, according to one embodiment of the invention

FIG. 6 illustrates an example inventory item display 600 listing "hot" items for a user interacting with a virtual world, according to one embodiment of the invention. When the user displays an avatar's inventory 610, a list 615 of any hot items is displayed 615, along with a list 620 of other items present in the avatar's inventory. In one embodiment, the client application 109 may determine that an item is "hot" if the item has a high interaction metric between itself and the lake 520. If the value of the interaction metric exceeds a predetermined threshold, then the item may be listed as a "hot" item. Illustratively, display 600 shows an avatar 605 near a lake, thus a fishing pole 625, fishing lure 630, and canoe 632 may be listed as "hot" items. If one of these items is part of the avatar's inventory, then it may be highlighted or emphasized in some way to indicate that it is a "hot" item for this location based on the interaction records of users at this location. Otherwise, "hot" items may be included in the list 615 put displayed using grayed-text to indicate that, although "hot" a given item is not in the avatar's inventory. Clicking on the information button 635 may result in the client application 109 displaying a map 405 along with other useful information regarding the item, similar to the inventory item display 300 of FIG. 3.

FIG. 7 is a table 700 illustrating a set of interaction records stored in the user index 105, according to one embodiment of the invention. As shown, the interaction records in table 700 include a field 705 for ordering an object, a field 710 for the name of an object, a field 715 for an interaction time, a field 720 for an interaction location, and a field 725 listing an external object used with the object 710. Illustratively, records 730, 740 and 750 are ordered according to the total amount of time 715 each object has been used by all users. Thus, if these objects are displayed as "hot," the fishing pole, lure, and canoe would be displayed first, second, and third, respectively. For example, assume that for an object to be "hot," the interaction time (at a given location) needs to exceed two hours. In such a case, the fishing pole (record 730) and the fishing lure (record 740) are "hot," relative to the lake location, but the canoe (record 750) is not. Of course, one of ordinary skill in the art will recognize that other interactions may be stored, such as where an object was acquired, sold, purchased, repaired, filled, reloaded, and the like.

In one embodiment, interaction records may reflect a particular user's preferences for using objects. For example, if a user (through their avatar) interacts with a fishing pole much more often than the other users, then the interaction metric for the fishing pole is much stronger for that user. Furthermore, if a user (through their avatar) interacts with the fishing pole regardless of which external objects are nearby, then the interaction records may include this information. Thus, the fishing pole may appear as a hot item even though no lake is present.

Figure 8:
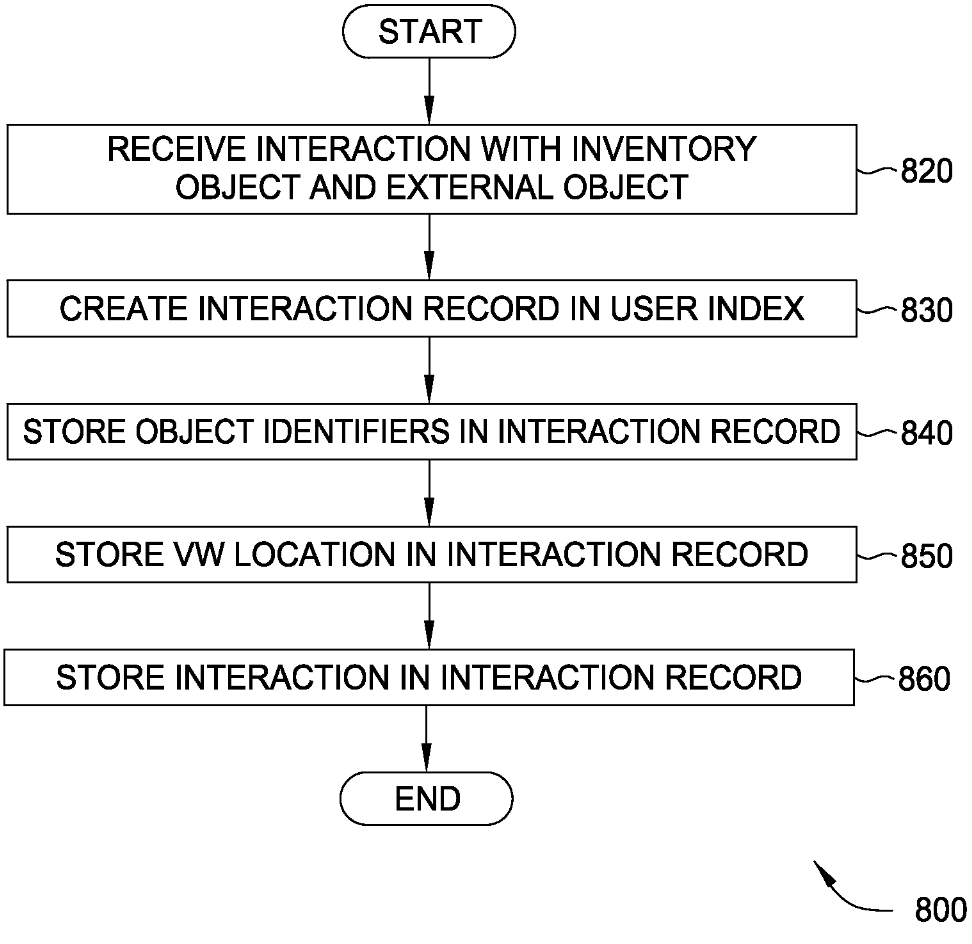
FIG. 8 is a flow diagram illustrating a method for generating interaction records based on user interactions with objects, according to one embodiment of the invention.

FIG. 8 is a flow diagram illustrating a method 800 for generating interaction records based on user interactions with objects, according to one embodiment of the invention. Persons skilled in the art will understand that, even though the following methods are described in conjunction with the systems of FIGS. 1-2, any system configured to perform the method steps, in any order, is within the scope of the present invention.

As shown, method 800 begins at step 820, where a virtual world identifies an interaction between an object in an avatar's inventory and an element of the virtual world (i.e., with an external object). In response, an interaction record 106 may be created and stored in the user index 105 at step 830. At step 840, object identifiers may be stored in the interaction record 106. For example, the object identifier may be an object name, an alphanumeric code, etc. At step 850, data describing the object's location may be stored in the interaction record. Such location data may include, e.g., the object's location coordinates, the object's distance from the user when the interaction took place, the object's position relative to other objects in the virtual world, etc.

At step 860, data describing the user's actions may be stored in the interaction record. Such data may include the user's interaction with the object (e.g., "caught fish with fishing pole," "picked up box," etc.). Further, the data may also include information characterizing the nature of the interaction (e.g., "caught eleven fish in lake," "operated all controls on kiosk," "glanced at billboard," etc.). Furthermore, the data may also characterize other activities engaged in buy the user (i.e., other than the interaction itself) at the time of interaction (e.g., "read billboard while walking," etc.). After step 860, the method 800 terminates. Of course, the method 800 is provided for illustrative purposes only, and is not limiting of the invention. It is contemplated that the steps of method 800 may be modified to incorporate other data describing user interactions into the user index. Such modifications may be made to suit particular situations, and are thus contemplated to be in the scope of the invention.

Figure 9:
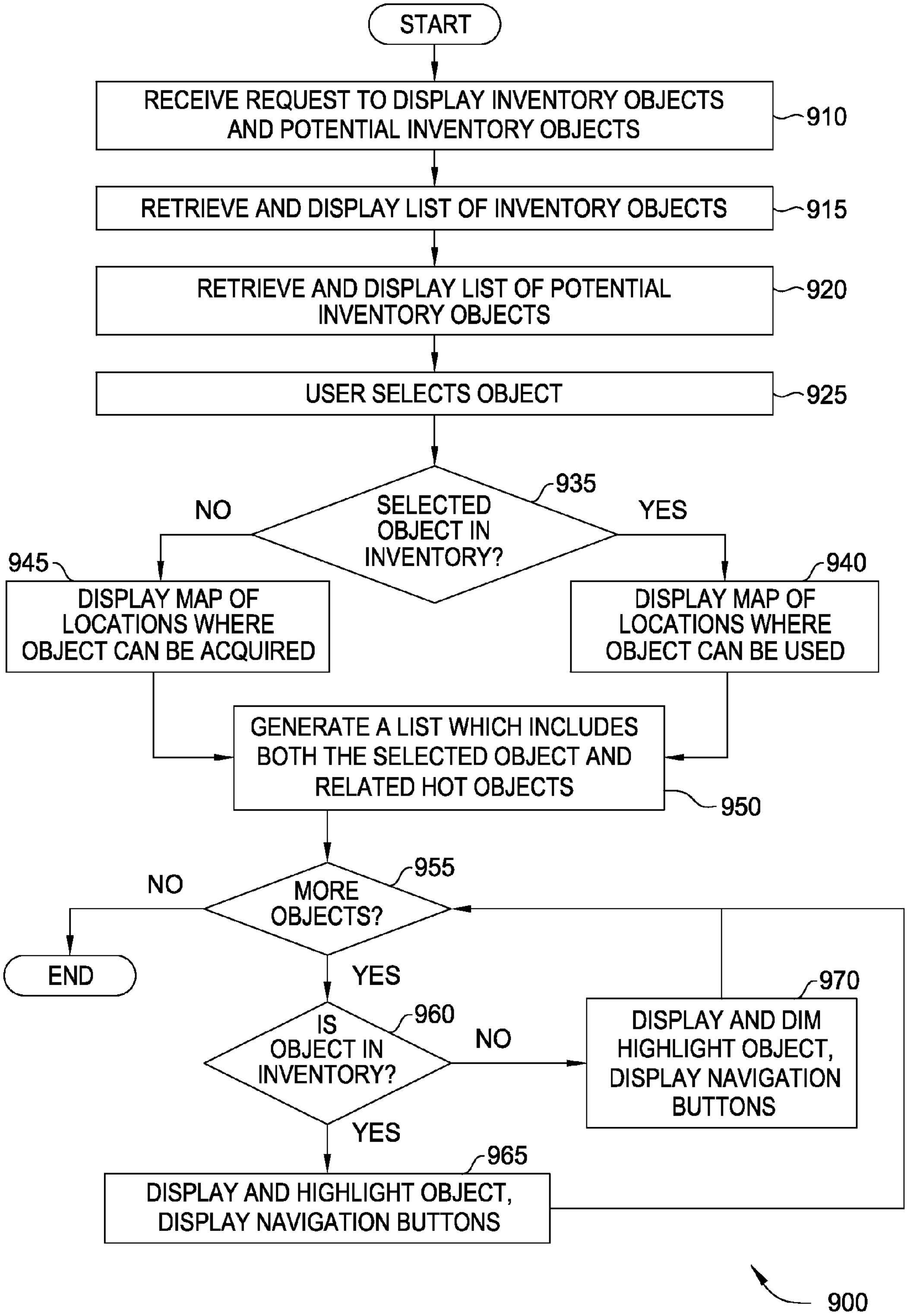
FIG. 9 is a flow diagram illustrating a method for generating a map and a list of related inventory objects, according to one embodiment of the invention.

FIG. 9 is a flow diagram illustrating a method 900 for generating a map of a virtual environment and a list of inventory objects, according to one embodiment of the invention. As shown, the method 900 begins at step 910, where the client application 109 receives a request to display objects in the avatar's inventory (and possibly objects that may be obtained by the avatar). At step 915, the client application 109 retrieves a list of objects in the avatar's possession. At step 920, the client application 109 may identify a set of potential inventory items available in the virtual world 130. The resulting lists of objects may be displayed to the user.

At step 925, the user may select one of the objects. At step 935, if the selected object is in the avatar's inventory (i.e., the object is in the list of objects generated at step 915), then the client application 109 may display a map of locations where the object can be used (step 940). However, if the selected object is not in the avatar's inventory (i.e., the object is in the list of objects generated at step 920), the client application 109 may display a map highlighting locations in the virtual world where the selected object can be acquired (step 945). At step 950, the client application 109 may generate a list that includes the selected object and any related "hot" objects. As described above, e.g., if a fishing pole object were "hot" at the lake, then the related item of a "fishing lure" may be identified if it is also a "hot" object at a lake.

At step 955, client the application 109 may determine whether there is another object in the list of related, "hot" objects. As described for FIG. 4, objects may be related to the selected object based upon their usefulness with the same external object (i.e. a lake). However, an object may be related based upon how often it is used with the selected object, regardless of location. For example, an arrow may be listed as a hot object when the user selects a bow. If there is another hot object to be listed, then at step 960 the client application 109 may determine whether the object is in the avatar's inventory. If so, then the object is displayed and highlighted. Navigation buttons 415 and 420 are then added to the display generated by the client application 109. Note, if the object is not in the avatar's inventory, then the item may be grayed out or highlighted in the display of the objects (step 970). The method 900 terminates once no more objects remain in the list.

Figure 10:
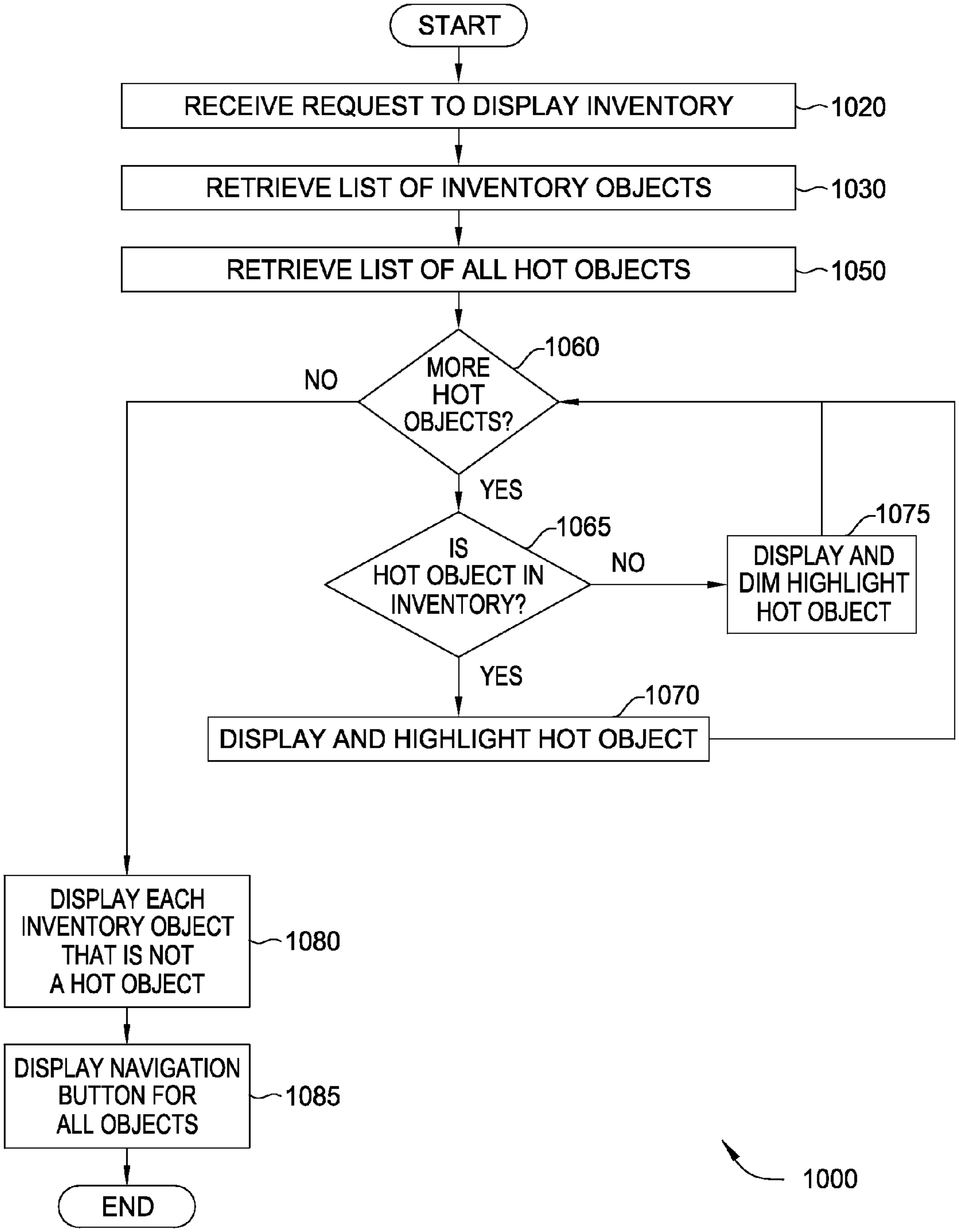
FIG. 10 is a flow diagram illustrating a method for generating a list of "hot" inventory objects and other inventory objects, according to one embodiment of the invention.

FIG. 10 is a flow diagram illustrating a method 1000 for generating a list of "hot" inventory objects, according to one embodiment of the invention. As shown, the method begins at step 1020 where a client application 109 receives a request to display objects then in the avatar's possession. At step 1030, the client application 109 retrieves a list of an avatar's inventory objects from the user index 105. At step 1050, the client application 109 determines a set of "hot" objects. In one embodiment, the interaction records 106 may be used to identify the external objects (e.g., elements or locations of the virtual world) that are near the user at that point in time. For example, as discussed above, "hot" items may be determined using the interaction records 106. At step 1060, if another hot object remains in the list, then at step 1065, if the object is in the avatar's inventory, then the object is displayed and highlighted. However, if the object is not in the avatar's inventory, then the display of that object in the list may be grayed out to indicate such to the user (step 1075). At step 1080, the remaining objects are displayed to the user (step 1080). At step 1085, the navigation buttons are displayed for the "hot" items and remaining inventory items. After step 1085, the method 1000 terminates.

Advantageously, as described above, embodiments of the invention allow users interacting with a virtual world to determine the "best" places to use and acquire inventory objects within the virtual world. Further embodiments of the invention may be configured to notify users of useful inventory items when an avatar is at a particular location in the virtual environment. In particular, in one embodiment, interaction records store every interaction users of the virtual world engage in with virtual objects. The interaction records are stored on a central server associated with the virtual world. If many users interact with a particular object at a particular location, then that object may be identified as "hot." Doing so allows the virtual world application to leverage other users' past experiences to guide a user's interactions with an avatar's inventory objects and external elements of the virtual world. By using this method, a person may explore a virtual world in a more effective and efficient manner.

While the foregoing is directed to embodiments of the present invention, other and further embodiments of the invention may be devised without departing from the basic scope thereof, and the scope thereof is determined by the claims that follow.

What is claimed is:

1. A computer-implemented method to recommend objects usable at virtual locations in a virtual world based on frequency of use of the objects at the virtual locations, comprising:

monitoring the use of a first set of virtual objects by a plurality of avatars at a first location in a virtual environment;

defining, based on the monitoring, a subset of the first set of virtual objects that are used beyond a first predefined frequency threshold at the first location, wherein the subset is less than the first set of virtual objects, whereby the subset of the first set of virtual objects represents virtual objects used with relative frequency at the first location;

detecting an arrival of a first avatar at the first location in the virtual environment;

identifying a first virtual object, in an inventory of the first avatar, as being in the subset of the first set of virtual objects;

generating, based on the first virtual object being used at the first location by the plurality of avatars at a first frequency greater than the first predefined frequency threshold, a first recommendation for the first avatar to use, at the first location, the first virtual object, wherein the first recommendation is output for display;

identifying a second virtual object of the subset of the first set of virtual objects, wherein the second virtual object is not present in the inventory of the first avatar; and generating, based on the second virtual object being used at the first location at a second frequency greater a second predefined frequency threshold, a second recommendation for the first avatar to acquire the second virtual object, for use in conjunction with the first virtual object at the first location, wherein the second recommendation is output for display.

2. The method of claim 1, wherein the first and second frequencies comprise different measures of frequency, the method further comprising, prior to identifying the first set of virtual objects, receiving a request from a user of the virtual environment to display the list virtual objects in the inventory of the avatar.

3. The method of claim 2, wherein generating the first recommendation is further based on the first virtual item being in the inventory of the first avatar, wherein the generating second recommendation is further based on the second item of inventory not being in the inventory of the first avatar, the method further comprising:

determining a set difference between the first set of virtual objects and the identified subset to generate a second set of virtual objects, wherein the second set of virtual objects are not in the inventory of the avatar, wherein the second set of virtual objects includes at least the second virtual object, and wherein the second recommendation includes the second set of virtual objects.

4. The method of claim 3, wherein the first avatar is not one of the plurality of avatars, the method further comprising:

receiving a selection of the first virtual object; and generating a display providing a description of how the first virtual object was used by the users of the virtual environment.

5. The method of claim 4, further comprising:

determining, prior to generating the second recommendation, that the first virtual object and the second virtual object have been used in conjunction with one another by users of the virtual environment; and generating a display providing a description of how the first virtual object and the second virtual object have been used in conjunction with one another by users of the virtual environment.

6. The method of claim 5, wherein the first frequency threshold and the second frequency threshold are different thresholds and are user-configurable, wherein the method further comprises:

generating a display of a second location identifying where the second virtual object is available to users of the virtual environment.

7. A computer program product to recommend objects usable at virtual locations in a virtual world based on frequency of use of the objects at the virtual locations, comprising:

a computer-readable storage medium having computer-readable program code embodied therewith, the computer-readable program code comprising:

computer-readable program code configured to monitor the use of a first set of virtual objects by a plurality of avatars at a first location in a virtual environment;

computer-readable program code configured to define, based on the monitoring, a subset of the first set of virtual objects that are used beyond a first predefined frequency threshold at the first location, wherein the subset is less than the first set of virtual objects, whereby the subset of the first set of virtual objects represents virtual objects used with relative frequency at the first location;

computer-readable program code configured to detect an arrival of a first avatar at the first location in the virtual environment;

computer-readable program code configured to identify a first virtual object, in an inventory of the first avatar, as being in the subset of the first set of virtual objects;

computer-readable program code configured to generate, based on the first virtual object being used at the first location by the plurality of avatars at a first frequency greater than the first frequency threshold, a first recommendation for the first avatar to use, at the first location, the first virtual object, wherein the first recommendation is output for computer-readable program code configured to identify a second virtual object of the subset of the first set of virtual objects, wherein the second virtual object is not present in the inventory of the first avatar; and computer-readable program code configured to generate, based on the second virtual object being used at the first location at a second frequency greater a second predefined frequency threshold, a second recommendation for the first avatar to acquire the second virtual object, for use in conjunction with the first virtual object at the first location, wherein the second recommendation is output for display.

8. The computer program product of claim 7, wherein the first and second frequencies comprise different measures of frequency, the computer-readable program code further comprising computer-readable program code configured to, prior to identifying the first set of virtual objects, receive a request from a user of the virtual environment to display the list virtual objects in the inventory of the avatar.

9. The computer program product of claim 8, wherein generating the first recommendation is further based on the first virtual item being in the inventory of the first avatar, wherein the generating second recommendation is further based on the second item of inventory not being in the inventory of the first avatar, the computer-readable program code further comprising:

computer-readable program code configured to determine a set difference between the first set of virtual objects and the identified subset to generate a second set of virtual objects, wherein the second set of virtual objects are not in the inventory of the avatar, wherein the second set of virtual objects includes at least the second virtual object, and wherein the second recommendation includes the second set of virtual objects.

10. The computer program product of claim 9, wherein the first avatar is not one of the plurality of avatars, the computer-readable program code further comprising:

receiving a selection of the first virtual object; and generating a display providing a description of how the first virtual object was used by the users of the virtual environment.

11. The computer program product of claim 10, the computer-readable program code further comprising:

determining, prior to generating the second recommendation, that the first virtual object and the second virtual object have been used in conjunction with one another by users of the virtual environment; and computer-readable program code configured to generate a display providing a description of how the first virtual object and the second virtual object have been used in conjunction with one another by users of the virtual environment.

12. The computer program product of claim 11, wherein the first frequency threshold and the second frequency threshold are different thresholds and are user-configurable, wherein the computer program product further comprises:

computer-readable program code configured to generate a display of a second location identifying where the object is available to users of the virtual environment.

13. A system, comprising:

a processor; and a memory containing a program, which when executed by the processor, is configured to perform an operation to recommend objects usable at virtual locations in a virtual world based on frequency of use of the objects at the virtual locations, the operation comprising:

monitoring the use of a first set of virtual objects by a plurality of avatars at a first location in a virtual environment;

defining, based on the monitoring, a subset of the first set of virtual objects that are used beyond a first predefined frequency threshold at the first location, wherein the subset is less than the first set of virtual objects, whereby the subset of the first set of virtual objects represents virtual objects used with relative frequency at the first location;

detecting an arrival of a first avatar at the first location in the virtual environment;

identifying a first virtual object, in an inventory of the first avatar, as being in the subset of the first set of virtual objects;

generating, based on the first virtual object being used at the first location by the plurality of avatars at a first frequency greater than the first predefined frequency threshold, a first recommendation for the first avatar to use, at the first location, the first virtual object, wherein the first recommendation is output for display;

identifying a second virtual object of the subset of the first set of virtual objects, wherein the second virtual object is not present in the inventory of the first avatar; and generating, based on the second virtual object being used at the first location at a second frequency greater a second predefined frequency threshold, a second recommendation for the first avatar to acquire the second virtual object, for use in conjunction with the first virtual object at the first location, wherein the second recommendation is output for display.

14. The system of claim 13, wherein the first and second frequencies comprise different measures of frequency, wherein the operation further comprises, prior to identifying the first set of virtual objects, receiving a request from a user of the virtual environment to display the list virtual objects in the inventory of the avatar.

15. The system of claim 14, wherein generating the first recommendation is further based on the first virtual item being in the inventory of the first avatar, wherein the generating second recommendation is further based on the second item of inventory not being in the inventory of the first avatar, wherein the operation further comprises:

determining a set difference between the first set of virtual objects and the identified subset to generate a second set of virtual objects, wherein the second set of virtual objects are not in the inventory of the avatar, wherein the second set of virtual objects includes at least the second virtual object, and wherein the second recommendation includes the second set of virtual objects.

16. The system of claim 15, wherein the first avatar is not one of the plurality of avatars, wherein the operation further comprises:

receiving a selection of the first virtual object; and generating a display providing a description of how the first virtual object was used by the users of the virtual environment.

17. The system of claim 16, wherein the operation further comprises:

determining, prior to generating the second recommendation, that the first virtual object and the second virtual object have been used in conjunction with one another by users of the virtual environment; and generating a display providing a description of how the first virtual object and the second virtual object have been used in conjunction with one another by users of the virtual environment.

18. The system of claim 17, wherein the operation further comprises:

generating a display of a second location identifying where the object is available to users of the virtual environment.

19. The system of claim 18, wherein the operation is performed in order to reduce a number of different potential combinations of virtual objects that avatars try to use at different virtual locations in the virtual world without guidance as to which specific combinations of virtual objects are feasibly used together at specific virtual locations, wherein the first frequency threshold and the second frequency threshold are different.

20. The system of claim 19, wherein the first and second recommendations are generated in order to reduce the number of different potential combinations of virtual objects that avatars try to use at different virtual locations in the virtual world without guidance as to which specific combinations of virtual objects are feasibly used together at specific virtual locations.

* * * * *